(12) United States Patent
Kübel

(10) Patent No.: US 8,678,036 B2
(45) Date of Patent: Mar. 25, 2014

(54) SEALING HOSE

(76) Inventor: Johann Kübel, Kasten (AT)

( * ) Notice: Subject to any disclaimer, the term of this patent is extended or adjusted under 35 U.S.C. 154(b) by 951 days.

(21) Appl. No.: 12/770,969

(22) Filed: Apr. 30, 2010

(65) Prior Publication Data
US 2011/0265902 A1 Nov. 3, 2011

(51) Int. Cl.
*F16L 55/16* (2006.01)

(52) U.S. Cl.
USPC ......... 138/98; 138/124; 428/36.1; 405/150.1; 264/269; 156/287

(58) Field of Classification Search
USPC ......... 138/98, 124–126; 428/36.1; 405/150.1; 264/269; 156/287
See application file for complete search history.

(56) References Cited

U.S. PATENT DOCUMENTS

| | | | | |
|---|---|---|---|---|
| 4,576,205 A | * | 3/1986 | Morinaga et al. | 138/98 |
| 5,077,107 A | * | 12/1991 | Kaneda et al. | 428/36.1 |
| 7,891,381 B2 | * | 2/2011 | Anders et al. | 138/98 |
| 2002/0124898 A1 | * | 9/2002 | Renaud et al. | 138/98 |
| 2005/0028881 A1 | * | 2/2005 | Smith et al. | 138/98 |
| 2008/0277012 A1 | * | 11/2008 | Anders et al. | 138/98 |

* cited by examiner

*Primary Examiner* — Patrick F Brinson
(74) *Attorney, Agent, or Firm* — Laurence A. Greenberg; Werner H. Stemer; Ralph E. Locher

(57) ABSTRACT

A sealing tube for the internal lining of fluid lines, in particular waste water lines, includes at least one tubular fabric ply, which is impregnated or saturated with a synthetic resin having a preferably gel-like or concentrated consistency. The weft bands or threads, which run in the circumferential direction, are formed by glass fibers or threads, in particular only by glass fibers or threads. The warp bands or threads, which run in the longitudinal direction of the sealing tube, are formed by, if necessary elastically stretchable, glass threads and/or rubber threads and/or plastics threads.

30 Claims, 4 Drawing Sheets

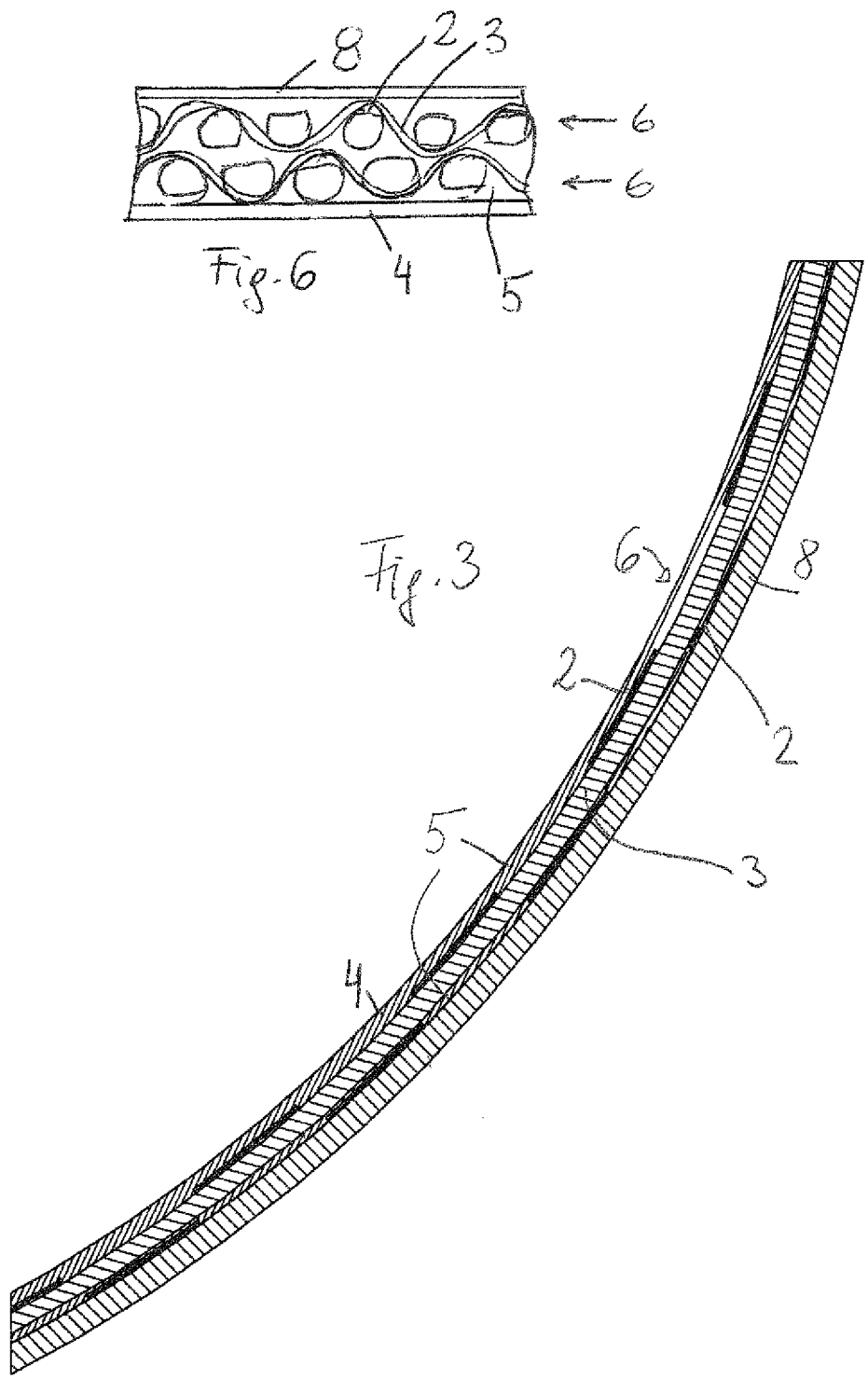

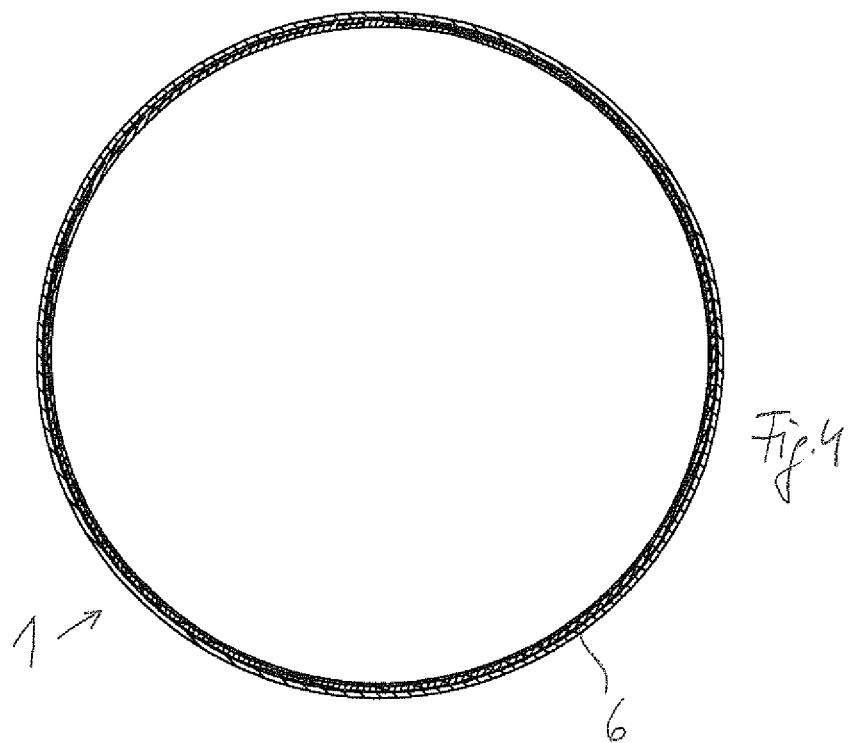
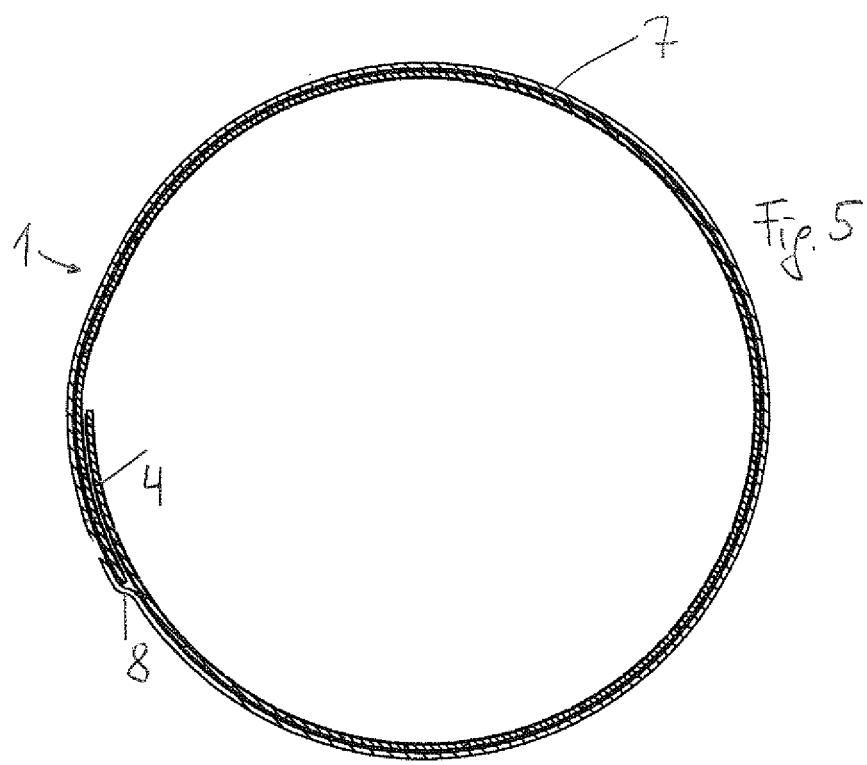

SEALING HOSE

BACKGROUND OF THE INVENTION

Field of the Invention

The invention relates to a sealing tube for the internal lining of fluid lines, in particular waste water lines. The aim of the invention is to produce a sealing tube with which leaking fluid lines can be lined easily on the inside. Such a sealing tube is placed on the inner wall of a fluid line and pressed with a balloon against the wall of the fluid line. The UV- or microwave-curable synthetic resin, with which the fabric of the sealing tube is impregnated, is then cured and thus the sealing tube is held in place in a sealing manner on the inner wall of the fluid line.

The use of sealing tubes for sealing fluid lines is known. Known sealing tubes have for this purpose a layer of fibers which is impregnated with synthetic resin and, once placed on the inner wall of a fluid line, is cured with UV light. In addition, fluid lines are sealed by the placement and adhesive bonding of glass fiber mats which are impregnated with synthetic resins, are placed with an appropriate thickness on the inner wall of the fluid line and are cured there. In addition, there are known felts which are saturated with synthetic resins and are placed on the inner wall of fluid lines and cured in order to seal off leaks.

The disadvantage of the known seals and sealing tubes is that they are not easy to handle and do not ensure the necessary leaktightness. In addition, the known seals have a considerable weight and the manufacture and storage, transport and introduction or positioning of the sealing tubes are complicated and cause handling problems.

Moreover, the conventional sealing tubes have disadvantages with regard to their adaptability to the conditions present in the fluid lines, in particular at edges and depressions, and tend to leak.

BRIEF SUMMARY OF THE INVENTION

According to the invention, a sealing tube for the internal lining of fluid lines, in particular waste water lines, comprises at least one tubular fabric ply, which is impregnated or saturated with a synthetic resin having a preferably gel-like or concentrated consistency, of which the weft bands or threads, which run in the circumferential direction, are formed by glass fibers or threads, in particular only by glass fibers or threads, and of which the warp bands or threads, which run in the longitudinal direction of the sealing tube, are formed by, if necessary elastically stretchable, glass threads and/or rubber threads and/or plastics threads.

Such a sealing tube is lightweight and easy to produce. The warp bands or threads and weft bands or threads are impregnated with a synthetic resin having a gel-like consistency. Sealing tubes having such impregnated fabric can be stored and transported well, without an escape of synthetic resin being feared or the weft bands and warp bands losing synthetic resin. Due to the lightweight nature of the weft bands and warp bands, the sealing tube according to the invention overall has a low weight; nevertheless, owing to the materials selected, it is very strong and is highly stable in storage and leaktight in the cured state.

The leaktightness of the sealing tube and the handling thereof are improved if provision is made for a continuous layer of watertight plastic, or one which extends over the entire inner wall, to be applied, preferably sprayed, over the inner wall surface of the fabric ply impregnated with synthetic resin. The layer is firmly attached mechanically by anchoring and/or adhesively bonding the plastic of the layer into or onto the weft bands or threads and/or warp bands or threads.

The applied layer of watertight plastic also ensures sufficient leaktightness, even for complex applications with at the same time the highest flexibility of the sealing tube. The sealing tube can be pressed against wall unevennesses with an inflatable balloon which can be introduced into the inside of the sealing tube and thereby seals off leaks completely even when the surface is not smooth. The layer of watertight plastic can be formed on the inner wall surface of the fabric ply by spraying or else by thermal application of a layer of plastic for example by melting. It is essential in this case that this layer is connected mechanically or by adhesive bonding to the weft bands or threads and/or the warp bands or threads as well. The layer is advantageously applied to the inverted fabric ply, which has not yet been saturated with synthetic resin, if need be with the fabric tube in the inverted state.

For material choice, it is advantageous for the warp bands or threads to be formed by PU or PE.

The sealing tube is easy to produce if the fabric ply is circular knitted or circular woven or if the fabric ply has the form of a flat strip which is rolled into a tube or cylinder and of which the edge regions, which run in the longitudinal direction of the tube, overlap one another and are joined. As soon as the fabric ply is in the circular woven form, this produced circular woven tube is provided with the layer of plastic and then impregnated with the UV-curable or microwave-curable synthetic resin. Even if the fabric ply is produced in the form of a flat blank or flat strip, the impregnation takes place only once the layer of plastic has been applied to the wall surface, which is on the inside during use, of the fabric ply.

With regard to simple production or the obtainment of good strength, provision can be made for the weft bands or threads to run in planes perpendicularly to the longitudinal axis of the sealing tube or in particular to be circular knitted or circular woven and, with respect to one such plane around the circumference of the sealing tube, to have per revolution a pitch which corresponds at most to ten times, preferably at most to eight times, the width of one weft band or thread, wherein preferably the pitch of the weft bands or threads per revolution of a weft band or thread is from 2 to 12 mm, preferably from 4 to 8 mm.

The result of this is that the fabric ply can be produced continuously, wherein the circular knitted fabric ply produced can be impregnated with the layer of plastic and with synthetic resin directly in a following station. This continuous production affords the possibility of producing very long sealing tubes, for example of more than 100 m.

For transportation or storage and fitting, it may be advantageous for a film of plastic, preferably made of PVC or PP, which is ultimately also fitted, to be applied or attached to the outer wall surface of the fabric ply impregnated with synthetic resin.

It is advantageous for the circumferential thickness of the sealing tube to be from 1.5 to 4 mm. All synthetic resins that can be cured with UV or microwaves can be used as synthetic resin for the impregnation of the fabric ply.

The invention is explained for example in more detail in the following text with the aid of the drawing.

BRIEF DESCRIPTION OF THE SEVERAL VIEWS OF THE DRAWING

FIG. 3 shows a section perpendicular to the longitudinal direction of a sealing tube according to the invention.

FIG. 4 shows a sealing tube having a circular woven fabric ply.

FIG. 5 shows a sealing tube comprising a planar fabric ply deformed or rolled into a tube.

FIG. 6 shows a section through a detail of a sealing tube having two fabric plies.

DESCRIPTION OF THE INVENTION

Figure 1:
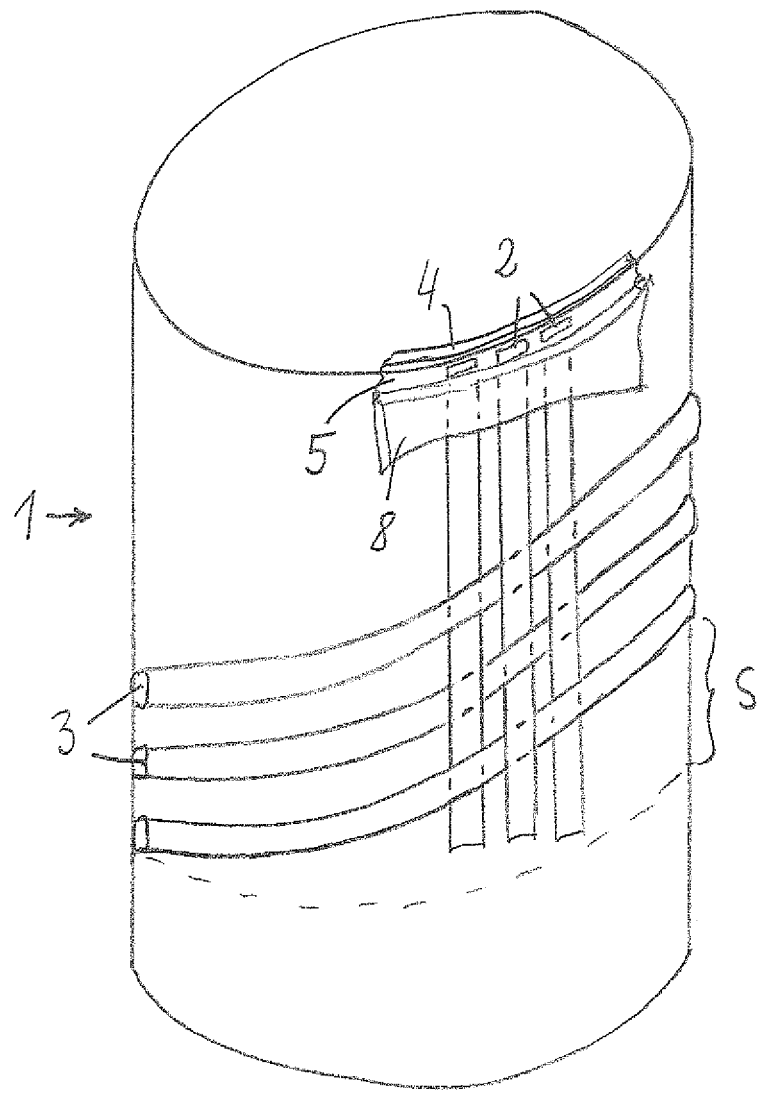
FIG. 1 schematically shows a structure of a sealing tube.

FIG. 1 shows a portion of a sealing tube 1 according to the invention. In the longitudinal direction of the sealing tube 1 there extend warp bands or threads 2, transversely to which run weft bands or threads 3. This fabric is impregnated or saturated with synthetic resin 5.

In the following text, warp bands and warp threads 2 are in each case considered to be equivalent and weft bands and weft threads 3 are in each case considered to be equivalent, and reference will always be made just to warp bands and weft bands. The bands are produced with the desired number of threads or fibers of plastic or glass and the desired strength to obtain the desired strength properties.

The fabric ply, comprising the warp bands 2 and the weft bands 3, is impregnated or saturated with microwave-curable or UV-curable synthetic resin. This synthetic resin 5 has a concentrated or gel-like consistency and thus does not escape from the fabric ply 6, 7.

As is illustrated in FIGS. 4 and 5, a fabric ply 6 may be circular woven or it is possible to produce a fabric ply 7 which, in order to produce a sealing tube 1, is overlapped in the edge regions 8 running in the longitudinal direction of the sealing tube 1 and thereby forms a tube.

As can be seen in FIG. 1, the fabric ply 6 or 7 is provided on the inside entirely with a continuous layer 4 of watertight plastic, or one which extends over the entire inner wall surface. This plastic is mechanically connected at least to the weft bands 3 and/or adhesively bonded thereto. A corresponding connection can also be made with the warp threads 2, as long as a corresponding adhesive bond can be formed between the plastic used for the layer 4 and the material of the warp bands 2.

It can be seen in FIG. 1 that the weft bands 3 do not run in a plane perpendicular to the longitudinal direction of the sealing tube 1, but rather have a pitch S running perpendicularly with respect to a plane perpendicular to the longitudinal direction of the sealing tube 1. For this purpose, provision is made for the weft bands or threads 3 to run in planes perpendicularly to the longitudinal axis of the sealing tube, in particular to be circular knitted or circular woven and, if appropriate, with respect to one such plane around the circumference of the sealing tube, to have per revolution a pitch S which corresponds at most to ten times, preferably at most to eight times, the width of one weft band 3, wherein preferably the pitch of the weft bands 3 per revolution of one weft band 3 is from 2 to 12 mm, preferably from 4 to 8 mm.

It can be seen in FIG. 1 that the weft bands 3 and the warp bands 2 have cross-sectional areas of different sizes, wherein the cross-sectional area of the weft bands 3 is advantageously greater than that of the warp bands 2.

By selecting the dimensions of the warp bands 2 and weft bands 2 and the cross-sectional areas thereof, the flexibility and stretchability can be influenced.

For practical use, it has been found to be of advantage for the layer 4 with watertight plastic to be formed by PU, PVC, PP or PE and advantageously to have a thickness of from 0.1 to 0.5 mm, preferably from 0.1 to 0.3 mm, or for warp bands 2 produced with glass fibers to have in the circumferential direction of the fabric ply 6, 7 a width of from 1 to 5 mm, preferably from 3 to 4 mm, and a thickness of from 0.1 to 0.6 mm, preferably from 0.3 to 0.5 mm, and/or for warp bands 2 produced with plastics fibers to have in the circumferential direction of the fabric ply 6, 7 a width of from 1 to 8 mm, preferably from 1 to 6 mm, and a thickness of from 0.1 to 0.5 mm, preferably from 0.2 to 0.4 mm or for, in particular circular, warp bands 2 produced from rubber or elastically stretchable plastic to have a diameter of from 0.1 to 2 mm, preferably from 0.3 to 1.5 mm. The parameters are matched to the application.

In addition, it is of advantage for the weft bands 3 to have a width of from 2 to 8 mm, preferably from 3 to 6 mm, and a thickness of from 0.5 to 3.5 mm, preferably from 1 to 3 mm.

With a desired or sufficient strength or resistance of the sealing tube, the dimensions given above result, in a lightweight and flexible sealing tube which can be cured by UV light or microwaves and is able to meet practical demands.

To increase the strength properties or reinforcement of the fabric, provision can also be made for each weft to comprise a plurality of weft bands 3 that lie directly next to one another or are introduced next to one another or run parallel to one another.

In order to achieve a corresponding strength, but also bendability and flexibility of the sealing tube 1, provision can be made for the warp bands 2 formed by glass fibers to be formed by ECR glass fibers or threads of from 600 to 3200 tex, preferably from 2000 to 3000 tex.

Figure 2:
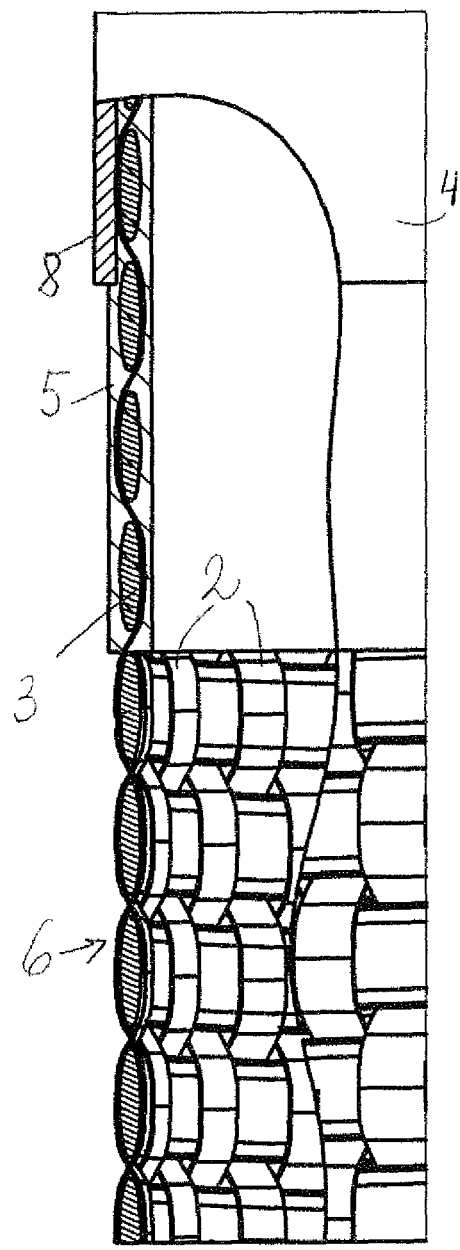
FIG. 2 shows a view of a detail of the sealing tube depicted in section through detail.

FIG. 2 shows a view of a detail of a wall of the sealing tube 1, and the weft threads 3, which are circularly interwoven with the warp threads 2, can be seen. This circular woven fabric ply 6 is embedded in a layer of UV-curable synthetic resin 5 and covered on the inner wall side with a layer 4 of watertight plastic. A further film of plastic 8 can be applied detachably on the outside of the sealing tube or of the fabric ply 6.

FIG. 3 illustrates a section through a detail of a sealing tube 1 according to the invention in a plane perpendicular to the longitudinal direction of the sealing tube 1. The fabric ply 6, which is impregnated with synthetic resin 5, comprises the warp bands 2 and weft bands 3 and is covered toward the inside with the layer 4 of watertight plastic, can be seen.

When the sealing tube 1 is introduced into a fluid line, it is cut to an appropriate length and introduced into the fluid line, for example using assembly robots. In situ, or in front of the region of the fluid line to be sealed, the sealing tube is inflated, for example using a balloon, or is pressed on the inner wall of the fluid line, and the synthetic resin 5 of the fabric ply 6 is cured by UV-light irradiation or with microwave irradiation. Thermal curing is also possible.

The following table provides dimensions of a number of sealing tubes 1 that have been produced for practical purposes and can be advantageously used. These sealing tubes 1 are sufficiently resistant to even large leaks in fluid lines and prevent the penetration or escape of fluids into or out of the fluid lines, owing to the good and unchangeable way in which they become formed onto the inner walls, which is possible due to the flexibility of the sealing tube 1.

TABLE

| Warp bands | | Weft bands | | | Thickness of the plastics outer layer | Overall wall thickness (mm) |
|---|---|---|---|---|---|---|
| Width (mm) | Thickness (mm) | Width (mm) | Thickness (mm) | Material | | |
| 2 | 0.3 | 4 | 0.8 | Glass fibers | 0.2 | 1.9 |
| 3 | 0.4 | 6 | 1.1 | Glass fibers | 0.2 | 2.9 |
| 4 | 0.5 | 7 | 1.5 | Plastics fibers | 0.3 | 4.2 |

The result of the materials selected is an advantageous flexibility and ease of handling of the sealing tube 1, but at the same time also stable durability and strength after curing. In particular when stretchable plastics or rubber are used, fluid line surface structures having relatively large differences in height can be sealed optimally.

It proves to be particularly advantageous for the weft bands 3 to extend substantially straight, or in a manner substantially undeformed by the interweaving, through the warp bands 2 over the circumference of the sealing tube 1, so that the fabric ply 6, 7 is readily deformable when the sealing tube is attached to the inside of a fluid line.

When impregnating the fabric ply, care is taken that the synthetic resin 5 provided for impregnation also penetrates into and between the fibers and threads of the bands and in particular fills the intermediate spaces between the warp bands 2 and the weft bands 3 and between the bands 2, 3 and the layer 4 of plastic.

Contrary to known liners made of impregnated fabric, the sealing tube 1 according to the invention has, in particular, advantages owing to the specific arrangement, materials and dimensions of the weft bands 3 and warp bands 2. A considerable advantage results above all due to the layer 4 of watertight plastic applied to the inner surface of the fabric ply, and so the fabric ply saturated with curable synthetic resin 5 contributes above all to the stability of the sealing tube 1 and the leaktightness of the sealing tube 1 is supported or also determined by the layer 4 of watertight plastic.

In the cured state, this layer 4 of watertight plastic is firmly joined to the cured synthetic resin 5 of the fabric ply and in addition to the fabric ply affords excellent leaktightness and strength properties.

Finally, the invention also relates to sealed or renewed pipe sections, the inner wall of which is sealed or lined with a sealing tube according to the invention.

It is possible to arrange a number of fabric plies 6, as illustrated in FIG. 6, one above the other, in order to increase the wall thickness of the sealing tube 1. When producing such a sealing tube, a further tubular fabric ply impregnated or saturated with synthetic resin is applied over an inner fabric ply 6 and the two fabric plies 6 are cured together. The layer 4 of watertight plastic can be applied toward the inside, i.e. in the direction of the surface of the fabric ply facing the inside of the pipe in use. A film 8 of plastic can be attached to the outer surface of the fabric plies 6. It is perfectly possible for more than two fabric plies, which are formed by UV-curable or by microwave-curable synthetic resin, also to be arranged one above the other, in order to achieve a correspondingly thick and resistant wall thickness. A sealing tube having a plurality of fabric plies can also be introduced into a fluid line to be lined and be placed or pressed on the inner wall of the fluid line and cured in situ without any difficulties.

No special precautions are required for connecting the fabric plies, since the impregnated or saturated fabric plies can be joined together effectively and over their entire surface.

The invention claimed is:

1. A sealing tube for the internal lining of fluid lines, comprising:
   at least one tubular fabric ply impregnated or saturated with a synthetic resin;
   said fabric ply having weft bands or threads running in a circumferential direction of the sealing tube and warp bands or threads running in a longitudinal direction of the sealing tube;
   wherein said weft bands or threads are formed by glass fibers or threads, and said warp bands or threads are formed of ECR glass fibers or threads of from 600 to 3200 tex.

2. The sealing tube according to claim 1, wherein said resin has a gel-like or concentrated consistency.

3. The sealing tube according to claim 1, wherein said weft bands or threads are formed only by glass fibers or threads.

4. The sealing tube according to claim 1, wherein said warp bands or threads are formed of elastically stretchable threads.

5. A sealing tube for the internal lining of fluid lines, comprising:
   at least one tubular fabric ply impregnated or saturated with a synthetic resin;
   said fabric ply having weft bands or threads running in a circumferential direction of the sealing tube and warp bands or threads running in a longitudinal direction of the sealing tube;
   wherein said weft bands or threads are formed by glass fibers or threads, and said warp bands or threads are formed of at least one type of thread selected from the group consisting of glass threads, rubber threads, and plastics threads; and
   a continuous layer of watertight plastic extending over an entire inner wall surface of said fabric ply, and facing inwardly during use.

6. The sealing tube according to claim 5, wherein said continuous layer of watertight plastic is sprayed onto the inner wall surface, and mechanically firmly attached by anchoring and/or adhesively bonding the plastic of the layer into or onto the weft bands or threads and/or warp bands or threads.

7. The sealing tube according to claim 1, wherein said weft bands or threads and said warp bands or threads have cross-sectional areas of different sizes, with a cross-sectional area of said weft bands or threads being greater than a cross-sectional area of said warp bands or threads.

8. The sealing tube according to claim 1, wherein said warp bands or threads are formed of PU or PE.

9. The sealing tube according to claim 5, wherein said layer with watertight plastic is formed of a polymer selected from the group consisting of PU, PVC, PP, or PE.

10. The sealing tube according to claim 9, wherein said layer of watertight plastic has a thickness of from 0.1 to 0.5 mm.

11. The sealing tube according to claim 9, wherein said layer of watertight plastic has a thickness of from 0.1 to 0.3 mm.

12. The sealing tube according to claim 1, wherein said fabric ply is circular knitted or circular woven.

13. The sealing tube according to claim 1, wherein said fabric ply is a flat strip rolled into a tube or cylinder and having edges running in the longitudinal direction of the tube, overlapping one another, and joined to one another in an overlap region.

14. The sealing tube according to claim 1, wherein said weft bands or threads run in planes perpendicularly to a longitudinal axis of the sealing tube or are circular-knitted or circular-woven and, with respect to one such plane around a circumference of the sealing tube, have a pitch per revolution that corresponds at most to ten times, a width of one weft band or thread.

15. The sealing tube according to claim 14, wherein the pitch per revolution corresponds at most to eight times the width of one weft band or thread, and the pitch of the weft bands or threads per revolution of one weft band or thread is from 2 to 12 mm.

16. The sealing tube according to claim 14, wherein the pitch of the weft bands or threads per revolution of one weft band or thread is from 4 to 8 mm.

17. The sealing tube according to claim 1, wherein said weft bands or threads have a width of from 2 to 8 mm and a thickness of from 0.5 to 3.5 mm.

18. The sealing tube according to claim 17, wherein said weft bands or threads have a width of from 3 to 6 mm and a thickness of from 1 to 3 mm.

19. The sealing tube according to claim 1, wherein:
said warp bands or threads are produced with glass fibers and have a width, in the circumferential direction of said fabric ply, of from 1 to 5 mm and a thickness of from 0.1 to 0.6 mm; and/or
said warp bands or threads are produced with plastics fibers and have a width, in the circumferential direction of said fabric ply, of from 1 to 8 mm and a thickness of from 0.1 to 0.5 mm; or
said warp bands or threads are produced from rubber or elastically stretchable plastic and have a diameter of from 0.1 to 2 mm.

20. The sealing tube according to claim 19, wherein:
said warp bands or threads of glass fibers have a width of from 3 to 4 mm and a thickness of from 0.3 to 0.5 mm; and/or
said warp bands or threads of plastics fibers have a width of from 1 to 6 mm and a thickness of from 0.2 to 0.4 mm; or
said warp bands or threads of rubber or elastically stretchable plastic are circular and have a diameter of from 0.3 to 1.5 mm.

21. The sealing tube according to claim 1, wherein each weft comprises a plurality of weft bands or threads that lie directly next to one another or are introduced next to one another or run parallel to one another.

22. The sealing tube according to claim 1, wherein a film of plastic is attached or fastened to an outer wall surface of said fabric ply facing outwardly during use.

23. The sealing tube according to claim 22, wherein said film is made of PVC or PP.

24. The sealing tube according to claim 1, which further comprises UV-curable synthetic resin filling intermediate spaces and depressions between said warp bands or threads and said weft bands or threads and said layer of plastic.

25. The sealing tube according to claim 1, wherein said warp bands or threads are formed of ECR glass fibers or threads with 2000 to 3000 tex.

26. The sealing tube according to claim 1, wherein a circumferential thickness of the sealing tube is from 1.5 mm to 4 mm.

27. The sealing tube according to claim 1, wherein said synthetic resin impregnating said fabric ply is curable with microwaves or UV radiation.

28. The sealing tube according to claim 1, which comprises a wall formed by a plurality of fabric plies that are saturated with UV-curable or microwave-curable plastic, lie one above the other, and are joined together.

29. A fluid pipe assembly, comprising:
a pipe having an inner wall surface; and
a sealing tube according to claim 1 placed and pressed in a sealing relationship on said inner wall surface of said pipe.

30. A section of a waste water pipeline, comprising:
a pipe section having an inner wall surface; and
a sealing tube according to claim 1 placed and pressed in a sealing relationship on said inner wall surface of said waste water pipeline.

* * * * *